United States Patent [19]
Jiang

[11] Patent Number: 6,043,705
[45] Date of Patent: Mar. 28, 2000

[54] BOOST CONVERTER HAVING EXTENDED HOLDUP TIME AND METHOD OF OPERATION

[75] Inventor: Yimin Jiang, Plano, Tex.

[73] Assignee: Lucent Technologies Inc., Murray Hill, N.J.

[21] Appl. No.: 09/048,069

[22] Filed: Mar. 25, 1998

[51] Int. Cl.$^7$ ...................................................... G05F 1/10
[52] U.S. Cl. ............................................................. 327/589
[58] Field of Search .............................. 327/92, 309, 321, 327/330, 390, 530, 531, 535, 536, 537, 545, 547, 588, 589; 363/15, 16, 81, 89, 98, 44, 46

[56] References Cited

U.S. PATENT DOCUMENTS

| | | | |
|---|---|---|---|
| 4,827,151 | 5/1989 | Okado | 363/37 |
| 5,115,185 | 5/1992 | Fraidlin et al. | 363/145 |
| 5,258,901 | 11/1993 | Fraidlin | 363/15 |
| 5,568,041 | 10/1996 | Hesterman | 323/207 |

*Primary Examiner*—My-Trang NuTon

[57] ABSTRACT

For use in a boost converter having a boost inductor coupled between an input and an output of the boost converter and an output capacitor coupled between rails of the output, an energy storage circuit for, and method of, extending a holdup time of the boost converter. In one embodiment, the energy storage circuit includes: (1) a holdup capacitor coupled to a first rail of the input, (2) a holdup switch, coupled to a second rail of the input and the holdup capacitor, capable of closing during a holdup mode to allow the holdup capacitor to discharge current into the input and (3) a voltage stabilizing circuit, coupled between the holdup capacitor and the output capacitor, that: (3a) when the boost converter is in a normal mode, provides a substantially impeded path for charge current to flow from the output capacitor to charge the holdup capacitor, and (3b) when the boost converter is in an initial phase of the holdup mode, provides a substantially unimpeded path for holdup current to flow from the holdup capacitor to the output capacitor prior to the closing of the holdup switch.

20 Claims, 3 Drawing Sheets

BOOST CONVERTER HAVING EXTENDED HOLDUP TIME AND METHOD OF OPERATION

TECHNICAL FIELD OF THE INVENTION

The present invention is directed, in general, to power conversion and, more specifically, to a boost converter having an extended holdup time and a method of operation thereof.

BACKGROUND OF THE INVENTION

Boost converters have been widely used in various power conversion applications such as single phase and three phase power factor corrected AC/DC switch-mode rectifiers. The boost stage processes the AC input and develops a DC output voltage that is typically between 400 volts and 800 volts. Boost converters are usually the topology of choice for providing a high output voltage from substantially lower DC voltages derived from sinusoidal input voltages. Boost converters are often used to supply power to computer or telecommunication systems that require power which is both clean and well regulated. If the power is interrupted, these systems usually require a "shut down" period in which to orderly prepare themselves. This period varies with application and should assure that an orderly shut down is completed. Boost converters employ various schemes that allow them to maintain their output voltage for a period of time after the input power has failed. One of the more prevalent "holdup" schemes is to use a large output capacitor that stores sufficient energy to maintain the output voltage above a minimum level for a specified period of time. For certain applications, this scheme requires prohibitively large capacitors in terms of size.

Another scheme to maintain boost converter output voltage during holdup operation is to use a collection of switches to connect a portion of the output capacitance across the boost converter input during holdup mode operation. This allows the boost circuitry to transfer energy stored in this capacitance to the boost converter output thereby maintaining the output voltage for a period of time.

Boost converters must also deal successfully with several other detrimental operational characteristics. One of these is "inrush" current, which is the potentially damaging initial, transient current that may flow into the boost converter when the AC power is first turned on. At AC power turn-on, an inrush current that is not limited in some way is typically much larger than the currents which flow during normal, steady-state operation. This unlimited inrush current may cause circuit element damage unless more robust components are selected to accommodate these larger values of transient current which normally leads to sacrifices in either component cost or size. Alternately, the nature of the boost converter design itself may allow for limiting or accommodation of the inrush current.

Another potentially detrimental operating characteristic occurs when the AC voltage input to the boost converter varies in a transient manner causing momentary fluctuations from its normal sinusoidal waveform. These fluctuations may instantaneously "surge" to higher values than expected as various other loads are added or removed from the AC line. These voltage perturbations, if not adequately isolated, may negatively affect boost converter operation.

Accordingly, what is needed in the art is a way to efficiently accomplish holdup mode operation in a boost converter that also effectively limits the effects of AC supply line inrush currents and accommodates AC supply line surge voltages.

SUMMARY OF THE INVENTION

To address the above-discussed deficiencies of the prior art, the present invention provides, for use in a boost converter having a boost inductor coupled between an input and an output of the boost converter and an output capacitor coupled between rails of the output, an energy storage circuit for, and method of, extending a holdup time of the boost converter. In one embodiment, the energy storage circuit includes: (1) a holdup capacitor coupled to a first rail of the input, (2) a holdup switch, coupled to a second rail of the input and the holdup capacitor, capable of closing during a holdup mode to allow the holdup capacitor to discharge current into the input and (3) a voltage stabilizing circuit, coupled between the holdup capacitor and the output capacitor, that: (3a) when the boost converter is in a normal mode, provides a substantially impeded path for charge current to flow from the output capacitor to charge the holdup capacitor, and (3b) when the boost converter is in an initial phase of the holdup mode, provides a substantially unimpeded path for holdup current to flow from the holdup capacitor to the output capacitor prior to the closing of the holdup switch.

The present invention therefore introduces the broad concept of providing a holdup capacitor that is only conditionally coupled to the output capacitor (by way of the voltage stabilizing circuit) and that is couplable to the boost converter's input to increase holdup time. A "substantially impeded path," as that phrase is employed herein, is defined as a path that presents a resistance to current flow sufficient to impede more than a current level necessary to charge the holdup capacitor. A "substantially unimpeded path" is capable of conducting more than a current level necessary to charge the output capacitor.

In one embodiment of the present invention, the voltage stabilizing circuit comprises: (1) a discrete resistor that provides the substantially impeded path for the charge current and (2) a diode, coupled in parallel with the discrete resistor, that provides the substantially unimpeded path for the holdup current. In an alternative embodiment, the discrete resistor is replaced with a conductor that presents an impedance along its length. Although the diode may present some impedance to current flow, it is not substantial.

In one embodiment of the present invention, the holdup switch forms a portion of an inrush current limiting circuit in the boost converter. Those skilled in the art are familiar with the structure and function of inrush current limiting circuits in the environment of boot converters. The holdup switch of the present invention can be advantageously integrated into an inrush current limiting circuit to yield a circuit having both functions with fewer components.

In one embodiment of the present invention, the holdup switch forms a portion of a surge bypass circuit in the boost converter. Those skilled in the art are familiar with the structure and function of surge bypass circuits in the environment of boot converters. As above, the energy storage circuit of the present invention can be advantageously integrated into a surge bypass circuit to yield a circuit having both functions with fewer components.

In one embodiment of the present invention, a diode in the bypass circuit diverts at least a portion of surge current toward the output capacitor. In this embodiment, at least some of the energy in the surge can be recovered by the output capacitor. In a related, but alternative embodiment, a diode in the bypass circuit diverts at least a portion of surge current toward the holdup capacitor allowing it to participate along with the output capacitor as well.

In one embodiment of the present invention, a bridge rectifier provides DC power to the input. The bridge rectifier may be single or multiple phase. Those skilled in the art are familiar with the structure and function of bridge rectifiers and their use with boost converters.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
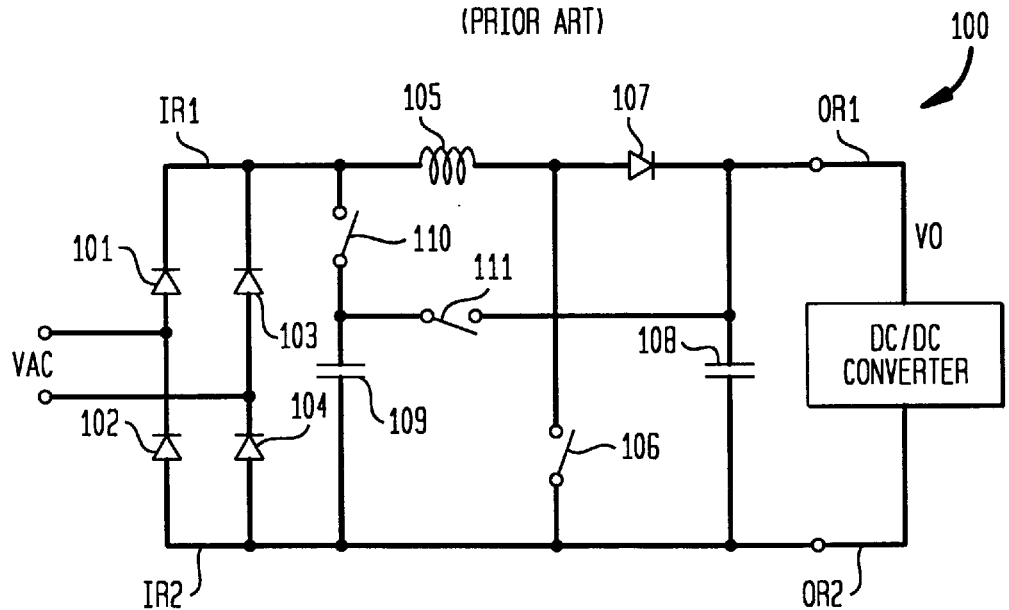
FIG. 1 illustrates a schematic drawing of a boost converter employing a prior art holdup circuit.

Referring initially to FIG. 1, illustrated is a schematic drawing of a boost converter 100 employing a prior art holdup circuit. The boost converter 100 includes an input bridge rectifier employing a plurality of diodes 101, 102, 103, 104, a boost inductor 105, a boost switch 106, a boost diode 107 and an output capacitor 108. The holdup circuit includes a holdup capacitor 109 and first and second holdup switches 110, 111. When the boost converter 100 is operating in a normal mode, the first holdup switch 110 is open and the second holdup switch 111 is closed. This places the holdup capacitor 109 in parallel with the output capacitor 108. Thus, the holdup capacitor 109 charges to the same voltage as the output capacitor 108 and provides additional filtering for the output in the normal operating mode.

When the input AC voltage fails, control circuitry (not shown) activates a holdup mode of operation for the boost converter 100 by closing the first holdup switch 110 and opening the second holdup switch 111. This action separates the two capacitors 108, 109 and places the holdup capacitor 109 across the input rails IR1, IR2 of the boost converter 100. With the boost switch 106 operating, the holdup capacitor 109 connected across the input rails IR1, IR2 may be discharged to a much lower voltage (almost fully discharged) while keeping the output voltage above the minimum value allowed by the DC/DC converter (fed by the boost converter) for proper operation, due to the nature of the boost conversion itself.

This technique of switching part of the output capacitance to the input rails IR1, IR2 allows the output capacitor 108 to be smaller in value for a given power and holdup time than would be otherwise necessary. For example, for a power of 400 watts, a holdup time of 100 milliseconds and an output voltage degradation from 400 volts to 360 volts, a single output capacitance value of 2.63 millifarads (2,630 microfarads) would be required which is very large from a practical standpoint. Using an output capacitor 108 in conjunction with a separate holdup capacitor 109 under the assumption that they are equal in value for the conditions stated above yields a total value of 0.84 millifarads, less than one third of the previous capacitance value above.

While the prior art holdup circuit provides an adequate solution for holdup operation of a boost converter, multiple switching devices (namely, the first and second holdup switches 110, 111) are required and the prior art holdup circuit does not address other circuit concerns such as inrush currents.

For a better understanding of the prior art holdup circuit described above see U.S. Pat. No. 5,258,901, entitled "Holdover Circuit for AC-TO-DC Converters," by Fraidlin, issued on Nov. 2, 1993, of which is incorporated herein by reference.

Figure 2:
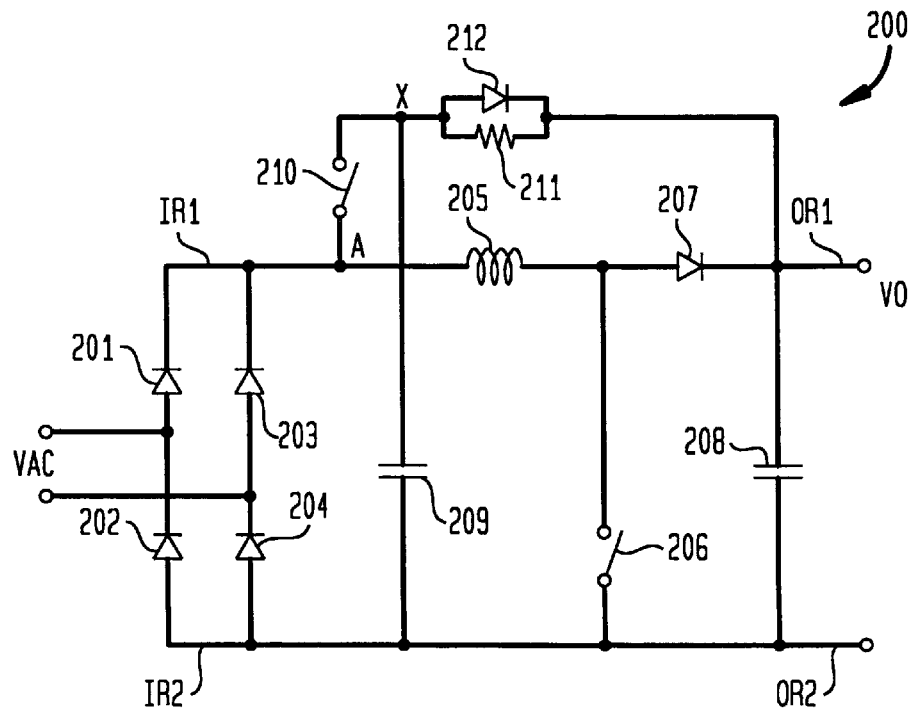
FIG. 2 illustrates a schematic diagram of a boost converter employing an embodiment of an energy storage circuit constructed according to the principles of the present invention.

Turning now to FIG. 2, illustrated is a schematic diagram of a boost converter 200 employing an embodiment of an energy storage circuit constructed according to the principles of the present invention. The boost converter 200 includes an input bridge rectifier employing a plurality of diodes 201, 202, 203, 204, a boost inductor 205, a boost switch 206, a boost diode 207 and an output capacitor 208. The energy storage circuit used for extending a holdup time comprises a holdup capacitor 209, a holdup switch 210, a discrete resistor 211 and a diode 212 whereby the discrete resistor 211 and diode 212 form a voltage stabilizing circuit. The boost inductor 205 is coupled between an input and an output of the boost converter 200 through the boost diode 207. The output capacitor 208 is coupled between the output rails OR1, OR2 of the boost converter 200.

When the boost converter 200 is operating in a normal mode, the voltage stabilizing circuit provides a substantially impeded path for charge current to flow from the output capacitor 208 to the holdup capacitor 209. In the normal mode, the discrete resistor 211 ensures that the steady state voltage across the holdup capacitor 209 will be essentially the same as the voltage across the output capacitor 208. The discrete resistor 211, therefore, provides the substantially impeded path from the output capacitor 209 to the holdup capacitor 208. Additionally, if a non-steady condition occurs (such as a load change), the diode 212 allows the holdup capacitor 209 to contribute a portion of the charge current directly to the output of the boost converter 200 if the voltage across the output capacitor 208 should decrease momentarily (due to output load variation, for example).

When the boost converter 200 is operating in an initial holdup mode, the voltage stabilizing circuit provides a substantially unimpeded path for holdup current to flow from the holdup capacitor 209 to the output capacitor 208. When the input AC voltage fails,, the initial holdup mode occurs during the time period prior to the closing of the holdup switch 210. After a period of time to detect the input AC voltage failure, switching control circuitry (not shown) activates the final holdup mode of operation for the boost converter 200 by causing the holdup switch 210 to close thereby connecting node X (between the holdup capacitor 209 and the voltage stabilizing circuit) to the input node A allowing the holdup capacitor 209 to discharge current into the input of the boost converter 200. In the final holdup mode of operation, the boost circuitry operates to pump energy from the holdup capacitor 209 to the output of the boost converter 200 to maintain the output voltage above the minimum value allowed by the DC/DC converter for proper operation for an extended period of time.

In the initial holdup mode, the holdup capacitor 209 contributes energy to the output directly through the substantially unimpeded path and during the final holdup mode of operation, the holdup capacitor 209 provides energy to the output through the boost action of the boost converter 200. Thus, almost all of the energy in the holdup capacitor 209 may be transferred to the output thereby optimizing the holdup time for the energy available.

Figure 3:
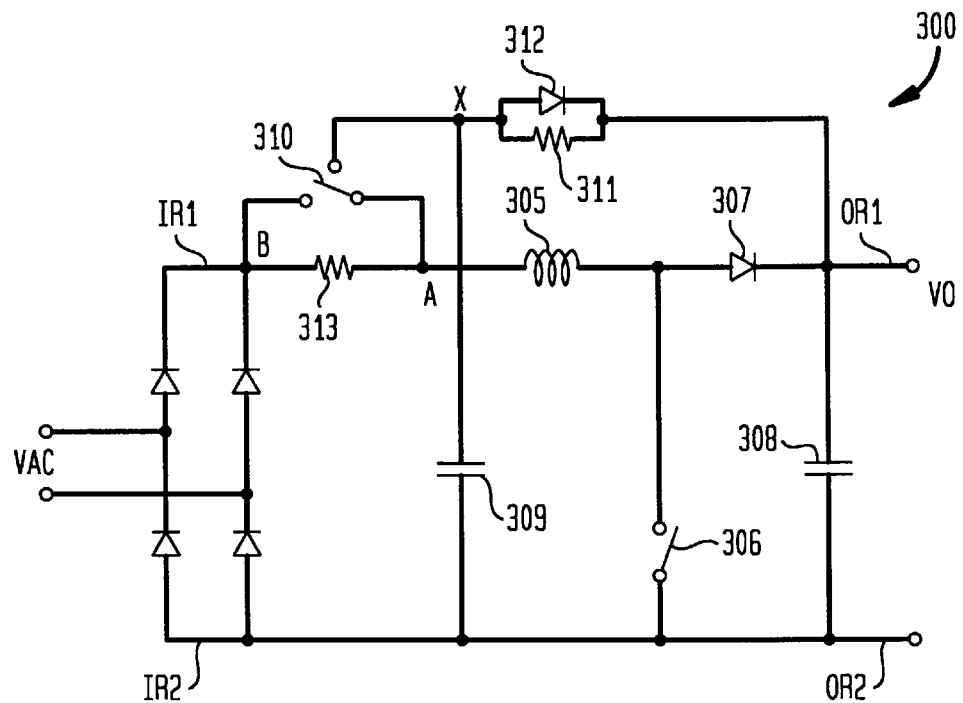
FIG. 3 illustrates a schematic diagram of a boost converter employing another embodiment of an energy storage circuit constructed according to the principles of the present invention.

Turning now to FIG. 3, illustrated is a schematic diagram of a boost converter 300 employing another embodiment of an energy storage circuit constructed according to the principles of the present invention. In the illustrated embodiment, the boost converter 300 employs a combined energy storage circuit used to extend holdup time and an inrush current limiting circuit. The boost converter 300 includes a boost inductor 305, a boost switch 306, a boost diode 307 and an output capacitor 308 in conjunction with an energy storage circuit comprising a holdup capacitor 309, a holdup switch 310, a discrete resistor 311 and a diode 312, where the resistor 311 and the diode 312 comprise a voltage stabilizing circuit. The holdup switch 310 replaces the switch 210 of FIG. 2 and a discrete resistor 313 has been added between nodes A and B along the input rail IR1 as shown.

The holdup switch 310, which forms a portion of an inrush limiting circuit, allows inrush current limiting circuitry to be integrated efficiently into the boost converter 300. When the boost converter 300 is initially powered up, a switching control circuit (not shown) positions the holdup switch 310 to connect node A to node X. This allows the resistor 313 to reduce or limit inrush currents by isolating other boost converter 300 elements from AC voltage. The resistor 313, acting in concert with the other circuit elements, produces an increased charging time constant which may be selected to limit the actual inrush current to a desired worst-case maximum value. Thereafter, the switching control circuitry then positions the holdup switch 310 to connect node A to node B effectively removing the resistor 313 and producing the normal mode of operation for the boost converter 300 which functions as described in FIG. 2 above. If the input AC voltage fails, initial and final holdup modes also operate as described with respect to FIG. 2, allowing the output voltage of the boost converter 300 to be maintained above a specified value for an extended period of time.

Figure 4:
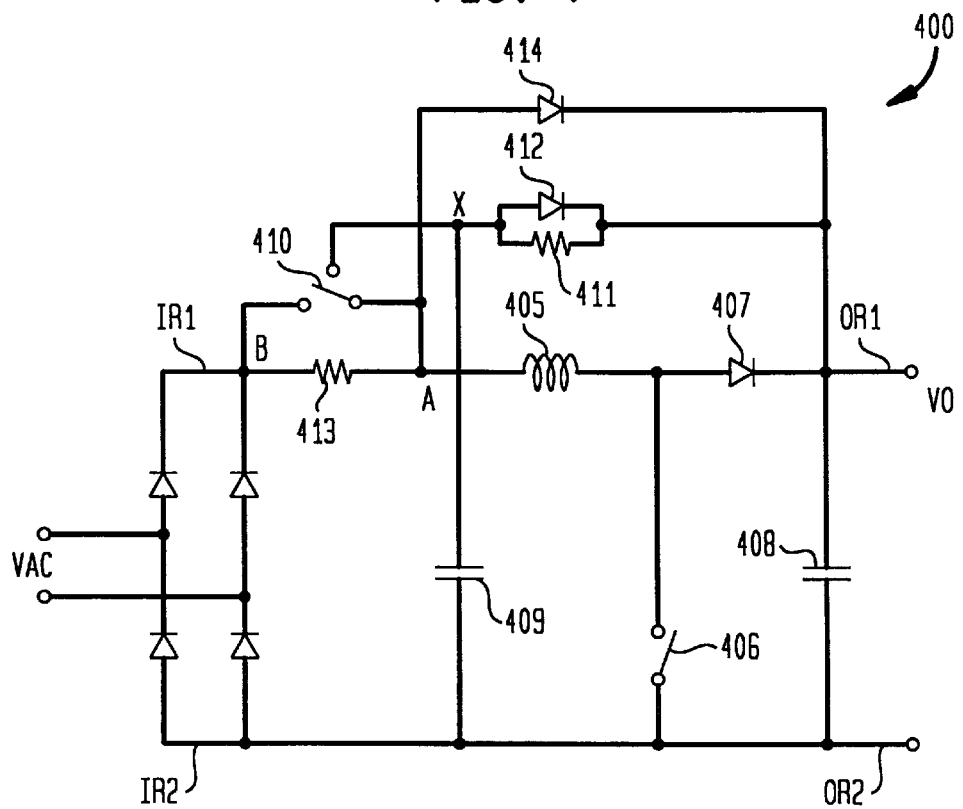
FIG. 4 illustrates a schematic diagram of a boost converter employing another embodiment of an energy storage circuit constructed according to the principles of the present invention.

Turning now to FIG. 4, illustrated is a schematic diagram of a boost converter 400 employing another embodiment of an energy storage circuit constructed according to the principles of the present invention. In the illustrated embodiment, the boost converter 400 employs a combined energy storage circuit used to extend holdup time, an inrush current limiting circuit and a surge bypass circuit. The boost converter 400 includes a boost inductor 405, a boost switch 406, a boost diode 407 and an output capacitor 408 in conjunction with an energy storage circuit comprising a holdup capacitor 409, a holdup switch 410, a discrete resistor 411 and a diode 412. The holdup switch 410 forms a portion of an inrush limiting circuit in conjunction with a discrete resistor 413 (connected between nodes A and B along the input rail IR1), and the holdup switch 410 forms a portion of a surge bypass circuit in conjunction with a surge diode 414 which diverts at least a portion of a surge current toward the output capacitor 408.

Operation of the boost converter 400 at power-up for inrush current limiting and in both the initial and final holdup modes is the same as described in FIG. 3 for the boost converter 300. In the normal mode of operation for the boost converter 400, the holdup switch 410 is positioned to connect node A to node B (as with the boost converter 300) which connects the anode of the surge diode 414 to the output of the bridge rectifier as shown. A surge voltage on the AC input line, which is a voltage greater in magnitude than normal, will produce a surge DC voltage at node A and a resulting surge current that is typically much greater in magnitude than normal. Therefore, at least a portion of its resulting surge current will be directed through the surge diode 414 to the output capacitor 408. In this embodiment, the holdup capacitor 409 absorbs a portion of the surge energy due to a significantly impeded path afforded by the resistor 411.

Figure 5:
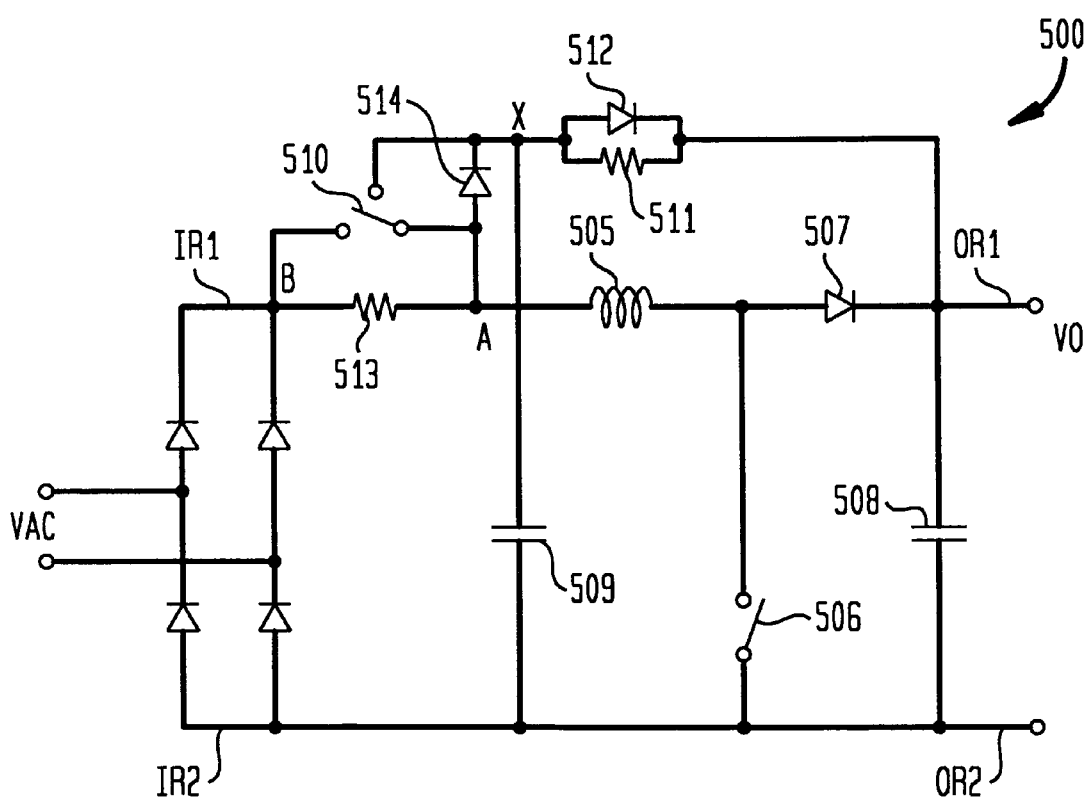
FIG. 5 illustrates a schematic diagram of a boost converter employing another embodiment of an energy storage circuit constructed according to the principles of the present invention.

Turning now to FIG. 5, illustrated is a schematic diagram of a boost converter 500 employing another embodiment of an energy storage circuit constructed according to the principles of the present invention. In the illustrated embodiment, the boost converter 500 employs a combined energy storage circuit used to extend holdup time, an inrush current limiting circuit and a surge bypass circuit. The boost converter 500 employs a boost inductor 505, a boost switch 506, a boost diode 507 and an output capacitor 508 in conjunction with an energy storage circuit comprising a holdup capacitor 509, a holdup switch 510, a discrete resistor 511 and a diode 512. The holdup switch 510 forms a portion of an inrush limiting circuit in conjunction with a discrete resistor 513 (connected between nodes A and B along the input rail IR1), and the holdup switch 510 forms a portion of a surge bypass circuit in conjunction with a surge diode 514 which diverts at least a portion of a surge current toward the holdup capacitor 509.

Operation of the boost converter 500 at power-up for inrush current limiting and in both the initial and final holdup modes is the same as described in FIG. 3 for the boost converter 300. In the normal mode of operation for the boost converter 500, the holdup switch 510 is positioned to connect node A to node B (as with the boost converter 300) which connects the anode of the surge diode 514 to the output of the bridge rectifier as shown. When a surge voltage occurs on the AC input line, at least a portion of its resulting surge current will be directed through the surge diode 514 to the holdup capacitor 509 and a portion typically will be directed on through diode 512 to the output capacitor 508. Directing the surge current in this manner typically allows both the holdup capacitor 509 and the output capacitor 508 to participate in absorbing the surge current energy which markedly reduces any voltage which is generated by the surge current.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa.

For a better understanding of power electronics and power converter topologies, such as boost power converters, see Kassakian, et al., *Principles of Power Electronics,* Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use in a boost converter having a boost inductor coupled between an input and an output of said boost converter and an output capacitor coupled between rails of said output, an energy storage circuit for extending a holdup time of said boost converter, comprising:
    a holdup capacitor coupled to a first rail of said input;
    a holdup switch, coupled to a second rail of said input and said holdup capacitor, capable of closing during a holdup mode to allow said holdup capacitor to discharge current into said input;
    a voltage stabilizing circuit, coupled between said holdup capacitor and said output capacitor, that:
        when said boost converter is in a normal mode, provides a substantially impeded path for charge current to flow from said output capacitor to charge said holdup capacitor, and
        when said boost converter is in an initial phase of said holdup mode, provides a substantially unimpeded path for holdup current to flow from said holdup capacitor to said output capacitor prior to said closing of said holdup switch.

2. The energy storage circuit as recited in claim 1 wherein said voltage stabilizing circuit comprises:
    a discrete resistor that provides said substantially impeded path for said charge current; and
    a diode, coupled in parallel with said discrete resistor, that provides said substantially unimpeded path for said holdup current.

3. The energy storage circuit as recited in claim 1 wherein said holdup switch forms a portion of an inrush current limiting circuit in said boost converter.

4. The energy storage circuit as recited in claim 1 wherein said holdup switch forms a portion of a surge bypass circuit in said boost converter.

5. The energy storage circuit as recited in claim 4 wherein a diode in said bypass circuit diverts at least a portion of surge current toward said output capacitor.

6. The energy storage circuit as recited in claim 4 wherein a diode in said bypass circuit diverts at least a portion of surge current toward said holdup capacitor.

7. The energy storage circuit as recited in claim 1 wherein a bridge rectifier provides DC power to said input.

8. For use in a boost converter having a boost inductor coupled between an input and an output of said boost converter and an output capacitor coupled between rails of said output, a method of extending a holdup time of said boost converter, comprising the steps of:
    coupling a holdup capacitor to a first rail of said input;
    closing a holdup switch, coupled to a second rail of said input and said holdup capacitor, during a holdup mode to allow said holdup capacitor to discharge current into said input;
    providing a substantially impeded path for charge current to flow from said output capacitor to charge said holdup capacitor when said boost converter is in a normal mode; and
    providing a substantially unimpeded path for holdup current to flow from said holdup capacitor to said output capacitor prior to said closing of said holdup switch when said boost converter is in an initial phase of said holdup mode.

9. The method as recited in claim 8 wherein said step of providing said substantially impeded path comprises the step of providing said substantially impeded path with a discrete resistor and wherein said step of providing said substantially unimpeded path comprises the step of providing said substantially unimpeded path with a diode coupled in parallel with said discrete resistor.

10. The method as recited in claim 8 wherein said holdup switch forms a portion of an inrush current limiting circuit in said boost converter, said method further comprising the step of limiting an inrush current to said boost converter.

11. The method as recited in claim 8 wherein said holdup switch forms a portion of a surge bypass circuit in said boost converter, said method further comprising the step of causing a surge to bypass said converter.

12. The method as recited in claim 11 wherein said step of causing comprises the step of diverting at least a portion of surge current toward said output capacitor.

13. The method as recited in claim 11 wherein said step of causing comprises the step of diverting at least a portion of surge current toward said holdup capacitor.

14. The method as recited in claim 8 further comprising the step of provides DC power to said input with a bridge rectifier.

15. A boost converter, comprising:
    a bridge rectifier;
    a boost inductor coupled between an input and an output of said boost converter, said input receiving DC power from said bridge rectifier;
    an output capacitor coupled between rails of said output; and
    an energy storage circuit for extending a holdup time of said boost converter, comprising:
        a holdup capacitor coupled to a first rail of said input;
        a holdup switch, coupled to a second rail of said input and said holdup capacitor, capable of closing during a holdup mode to allow said holdup capacitor to discharge current into said input; and
        a voltage stabilizing circuit, coupled between said holdup capacitor and said output capacitor, that:
            when said boost converter is in a normal mode, provides a substantially impeded path for charge current to flow from said output capacitor to charge said holdup capacitor, and
            when said boost converter is in an initial phase of said holdup mode, provides a substantially unimpeded path for holdup current to flow from said holdup capacitor to said output capacitor prior to said closing of said holdup switch.

16. The boost converter as recited in claim 15 wherein said voltage stabilizing circuit comprises:
    a discrete resistor that provides said substantially impeded path for said charge current; and
    a diode, coupled in parallel with said discrete resistor, that provides said substantially unimpeded path for said holdup current.

17. The boost converter as recited in claim 15 wherein said holdup switch forms a portion of an inrush current limiting circuit in said boost converter.

18. The boost converter as recited in claim 15 wherein said holdup switch forms a portion of a surge bypass circuit in said boost converter.

19. The boost converter as recited in claim 18 wherein a diode in said bypass circuit diverts at least a portion of surge current toward said output capacitor.

20. The boost converter as recited in claim 18 wherein a diode in said bypass circuit diverts at least a portion of surge current toward said holdup capacitor.

\* \* \* \* \*